Dec. 30, 1958    H. T. SUTHERLIN ET AL    2,866,475
VENT FOR PRESSURE RELIEF VALVE
Filed Sept. 1, 1954
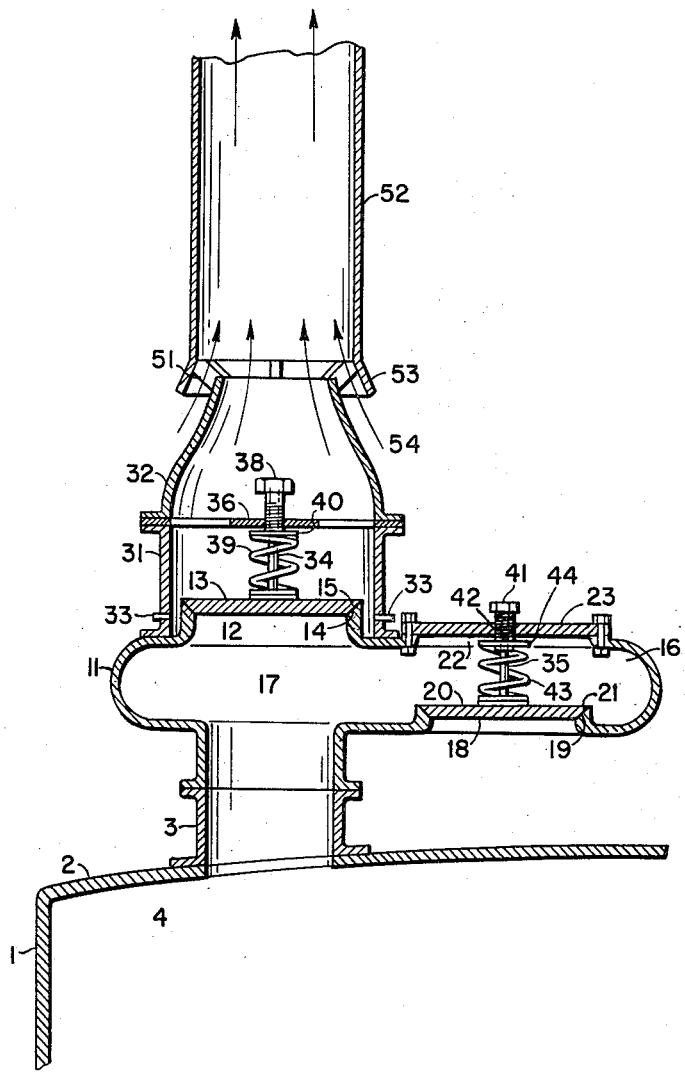
HARRY T. SUTHERLIN  INVENTORS
JOHN C. SOUDER
BY  *George J. Sieham*
ATTORNEY

United States Patent Office 2,866,475
Patented Dec. 30, 1958

2,866,475

VENT FOR PRESSURE RELIEF VALVE

Harry T. Sutherlin, Cranford, and John C. Souder, Mountainside, N. J., assignors to Esso Research and Engineering Company, a corporation of Delaware Application September 1, 1954, Serial No. 453,475

2 Claims. (Cl. 137—604)

The present invention relates to a safety valve structure such as may be applied to storage tanks. More particularly the invention relates to a pressure relief valve for venting pressure which may develop in storage tanks for volatile and vaporizable liquid as found in the petroleum industry. A principal purpose of the invention is to provide a valve structure, of the character contemplated, in which the venting of vapors does not entail additional hazards.

In the storage of volatile liquids such as gasoline and other more or less vaporizable liquids, it is found that dangerous pressures may be built up within a storage vessel as an effect of atmospheric temperature changes, and as a result of absorption of heat from the sun's rays by the walls and roof of the storage vessel. A similar condition may also be created when the tank is being filled and the volume of the vapor space in the tank is progressively reduced. Most tanks, therefore, are provided with pressure relief or breather valves. Such valve means usually provide not only against the development of excessive positive pressures, but also against the development of a partial vacuum within the vapor space. The latter condition may occur when the storage tank cools at night time, or when withdrawing liquid from the tank.

In a typical breather or pressure relief valve, the outlet of the valve is enclosed by means of a hood-like vent extension, having an open end directed downwardly onto the tank roof, or over the upper end of the side walls thereof. It has been found that where the vapors thus discharged are heavier than air, dangerous concentrations of the vapors may accumulate at ground level in the vicinity of the tank from which they are exhausted. In a large tank field, such accumulations may extend over considerable area, and may be further spread by small air currents at ground level to involve other areas normally considered to be beyond a recognized hazardous zone. It is an object of the present invention to provide a means whereby vapors exhausted by means of pressure relief valves, from storage vessels and the like, may be harmlessly dissipated.

The invention and its objects may be more fully understood from the following description when it is read in conjunction with the accompanying drawing, in which a valve structure and a portion of a tank with which it may be associated are shown in vertical section.

In the drawing, the numeral 1 designates the side wall of a storage tank, and the numeral 2 the roof thereof. The roof 2 is provided with a flanged nozzle or conduit member 3 which opens through the roof at one end into communication with the vapor space of the tank, indicated in the drawing by the numeral 4. At its upper end, the conduit 3 supports the body 11 of a typical pressure relief valve provided with a valve port 12 and valve disc 13 for the relief of positive pressure from the vapor space 4. The port 12 is provided with an annular seat 14 adapted to receive a corresponding seating surface portion 15 on disc 13.

The valve body 11 also is provided with a laterally extended portion 16 which, with the main portion of the valve, forms a chamber indicated by the numeral 17. The extension 16 is also provided with a valve port, as indicated by the numeral 18, having an annular seat 19, and a valve disc 20 having a seating surface portion 21 engageable on the seat 19. Whereas the valve port 12 opens outwardly from chamber 17 to relieve a positive pressure from within the tank 1, the valve port 18 opens inwardly to relieve a negative pressure within the tank. The upper portion of the extension 16 is additionally provided with an access opening 22, coaxial with the port 18 and of a diameter greater than the disc 20. A cover plate 23 is removably secured to the extension 16 to close the opening 22.

The valve further includes a cylindrical lower nozzle portion 31 which is disposed coaxially with the port 12 in radially spaced relation thereto, and a substantially conical upper extension portion thereof as designated by the numeral 32. As shown, the portions 31 and 32 are separate elements secured together by means of cooperating flanged ends, with the lower end of the lower nozzle portion similarly mounted on the upper surface of the valve body 11, all in substantially unitized relationship. It is contemplated however that the nozzle portions, or the nozzle portions and valve body, may be cast as integral units. Also as shown, the cylindrical nozzle portion 31 is provided with drainage ducts as indicated by the numerals 33. The upper end of the nozzle portion 32 has an outer end defining an orifice disposed in vertically spaced relation above the port 12 and the tank roof 2. The orifice is designed to avoid such restriction of flow as to interfere with rapid relief of pressure in the vapor space 4. In any event, the back pressure which may be created by any such restriction should not exceed that at which pressure within the tank is to be relieved. Each of the valve discs 13 and 20 carries a valve stem as indicated by the numerals 34 and 35, respectively, and extending upwardly therefrom. As shown, a guide for the stem 34 is provided by means of a spider 36 mounted in or between the nozzle portions 31 and 32 and having an annular hub portion 37. The hub 37 is internally threaded to receive an externally threaded hollow bolt 38 which in turn is adapted to receive the outer end of the valve stem 34. The numeral 39 designates a helical valve spring encircling the stem 34, engaging the valve disc 34 at one end, and at the other end engaged by the bolt 38 through a cap washer 40. The stem 35 is provided with a similar guide means by a hollow bolt 41 threaded through a suitable passage 42 in the cover 23. The valve disc 18 is held in pressured engagement with the seat 19 by means of a helical spring 43 encircling the stem 35 and engaged between the disc 20 and the bolt 41, through the cap washer 44.

Supported on the upper end of the nozzle portion 32, as by means such as the radial fins 51, is a vertical cylindrical stack or riser 52 having an inner diameter greater than that of the nozzle orifice. The lower end of the riser 52 includes an outwardly flared dependent skirt 53, and the riser and skirt provide an annular inlet passage 54 between them and the nozzle 32.

In the apparatus as described with reference to the accompanying drawing, the vapor space of the container vessel or tank 1 is in substantially direct communication with the valve chamber 17. In this apparatus each of the valve discs or closures 13 and 18 is loaded as by means of the springs 39 and 43 respectively; the spring load being regulated as by means of the hollow bolts 38 and 41 respectively. The load applied to the respective valve closures 13 and 18 by means of the springs 39 and 43 respectively will normally be such as to require a positive pressure in the vessel slightly above atmospheric to displace the valve closure 13, and a negative pressure in the vessel slightly below atmospheric to displace the valve closure 18. The exact pressure or load applied to the respective valve closures will be governed by the structural characteristics of the vessel and the safe operating pressure range as may be determined thereby. Also, although the invention has been described in its specific relationship to a valve structure wherein the valve discs, designated by the numerals 13 and 18, are spring loaded, it should be obvious that the invention may be combined equally as well with other types of valves. For example, the spring loaded valve discs may be replaced by discs wherein the internal pressures developed in the tank or vessel 1 may be opposed by the weight and inertia of the disc alone, or adjustably weighted by the addition or subtraction of separate weighting elements to the valve discs.

When the pressure within the vessel 1 exceeds a predetermined safe operating pressure, one or the other of valves 13 or 18 is displaced thereby. Excess positive pressure will displace the valve 13, venting vapor from the vessel vapor space 4 through the valve chamber 17 and port 12. The vapors vented through the port 12 are discharged from the discharge nozzle provided by the portions 31 and 32 into the lower end of the stack 52. The flow of vapors through the outer end of the nozzle portion 32 serves to induce a flow of atmospheric air through the venturi inlet passage 54 produced between the skirt 53 and the nozzle portion 32. The discharged vapors are thus diluted and discharged upwardly through the riser stack 52 into the surrounding atmosphere. In their diluted form, the vapors are less apt to form dangerous concentrations, and being discharged upwardly are more readily dissipated in convection currents rising from the tank roof. Another advantage obtained by the structure as shown and described may be attributed to the substantially straight vapor flow path provided by locating the outlet nozzle and stack immediately above and coaxially with the valve port.

What is claimed is:

1. In a safety valve structure, including a hollow valve body having an inlet adapted for connection to a container vessel in open communication with a vapor space therein, an outlet defining a valve port and annular valve seat, and a valve closure for said port disposed so as to engage said seat and so as to be movable from such engagement under pressure of vapors in said vapor space, whereby to vent vapors through said valve body and port and to relieve pressure in said vapor space; a means for discharging vapors vented through said valve body by way of said port, comprising a first tubular discharge conduit portion having an inner end mounted on said valve body coaxially enclosing said port and valve closure, and a second tubular discharge conduit portion in coaxial, substantially continuous, open communication with said first portion, said second conduit portion having an outer end which defines a discharge orifice of restricted cross-section, a plurality of support arms extended radially outward from the peripheral surface of said second conduit portion outer end, a riser stack supported by said arms in annularly spaced, substantially coaxial relation to said second conduit portion outer end, and an outwardly flared skirt dependent from the lower end of said stack extending downwardly therefrom beyond the outer end of said second conduit portion in radially spaced relation thereto, said skirt and the second conduit portion outer end between them defining an annular venutri throat opening upwardly into said stack.

2. A safety valve structure according to claim 1 which includes a valve stem extending outward from said valve closure coaxially of said conduit portions, a spider disposed transversely of said conduit portions beyond said closure, said spider having an annular hub adapted to receive said valve stem forming a guide therefor, a spring loading means between said valve closure and said spider, and means for regulating the load applied by said spring means adjustably supported by said spider.

References Cited in the file of this patent

UNITED STATES PATENTS

| | | |
|---|---|---|
| 170,974 | Westwater | Dec. 14, 1875 |
| 1,198,850 | Jones | Sept. 19, 1916 |
| 1,298,872 | Bowles | Apr. 1, 1919 |
| 1,686,918 | Monnett | Oct. 9, 1928 |
| 1,897,076 | Shand | Feb. 14, 1933 |